(12) United States Patent
Cota-Robles et al.

(10) Patent No.: US 7,356,817 B1
(45) Date of Patent: *Apr. 8, 2008

(54) REAL-TIME SCHEDULING OF VIRTUAL MACHINES

(75) Inventors: Erik C. Cota-Robles, Portland, OR (US); Krisztian Flautner, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/541,444

(22) Filed: Mar. 31, 2000

(51) Int. Cl.
G06F 9/455 (2006.01)

(52) U.S. Cl. .......................... 718/1; 710/262

(58) Field of Classification Search ............ 709/1, 709/100, 102–104, 107–108; 718/1, 100, 718/102, 103, 104, 107, 108; 710/260–269
See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,207,609 A | 6/1980 | Luiz et al. |
| 4,247,905 A | 1/1981 | Yoshida et al. |
| 4,278,837 A | 7/1981 | Best |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,571,672 A | 2/1986 | Hatada et al. |
| 4,759,064 A | 7/1988 | Chaum |
| 4,802,084 A | 1/1989 | Ikegaya et al. |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,237,616 A | 8/1993 | Abraham et al. |

(Continued)

FOREIGN PATENT DOCUMENTS

EP 478346 A2 9/1991

(Continued)

OTHER PUBLICATIONS

Goldberg, R., "Survey of Virtual Machine Research," IEEE Computer Magazine 7(6), pp. 34-45, 1974.

(Continued)

*Primary Examiner*—William Thomson
*Assistant Examiner*—George L. Opie
(74) *Attorney, Agent, or Firm*—Blakely, Sokoloff, Taylor & Zafman LLP (57) ABSTRACT

A method for scheduling a plurality of virtual machines includes: determining a resource requirement ($X_i$) for each virtual machine (VM); determining an interrupt period ($Y_i$) for each VM; and scheduling the plurality of VMs based, at least in part, on each respective $X_i$ and $Y_i$.

22 Claims, 7 Drawing Sheets

U.S. PATENT DOCUMENTS

| | | | |
|---|---|---|---|
| 5,255,379 A | 10/1993 | Melo | |
| 5,287,363 A | 2/1994 | Wolf et al. | |
| 5,293,424 A | 3/1994 | Holtey et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,437,033 A | 7/1995 | Inoue et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A | 4/1996 | Onodera | |
| 5,511,217 A | 4/1996 | Nakajima et al. | |
| 5,522,075 A | 5/1996 | Robinson et al. | |
| 5,528,513 A * | 6/1996 | Vaitzblit et al. | 718/103 |
| 5,530,860 A * | 6/1996 | Matsuura | 718/105 |
| 5,560,013 A | 9/1996 | Scalzi et al. | |
| 5,564,040 A | 10/1996 | Kubala | |
| 5,568,552 A | 10/1996 | Davis | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,684,948 A | 11/1997 | Johnson et al. | |
| 5,706,469 A | 1/1998 | Kobayashi | |
| 5,717,903 A | 2/1998 | Bonola | |
| 5,721,222 A | 2/1998 | Dingwall | |
| 5,729,760 A | 3/1998 | Poisner | |
| 5,737,604 A | 4/1998 | Miller et al. | |
| 5,737,760 A | 4/1998 | Grimmer, Jr. et al. | |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle et al. | |
| 5,796,845 A | 8/1998 | Serikawa et al. | |
| 5,805,712 A | 9/1998 | Davis | |
| 5,809,546 A | 9/1998 | Greenstein et al. | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,872,994 A | 2/1999 | Akiyama et al. | |
| 5,901,225 A | 5/1999 | Ireton et al. | |
| 5,903,752 A | 5/1999 | Dingwall et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | |
| 6,075,938 A * | 6/2000 | Bugnion et al. | 395/500.48 |
| 6,085,296 A | 7/2000 | Karkhanis et al. | |
| 6,088,262 A | 7/2000 | Nasu | |
| 6,092,095 A * | 7/2000 | Maytal | 709/100 |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Insley | |
| 6,148,379 A | 11/2000 | Schimmel | |
| 6,158,546 A | 12/2000 | Hanson et al. | |
| 6,175,924 B1 | 1/2001 | Arnold | |
| 6,175,925 B1 | 1/2001 | Nardone et al. | |
| 6,178,509 B1 | 1/2001 | Nardone et al. | |
| 6,182,089 B1 | 1/2001 | Ganapathy et al. | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |
| 6,249,872 B1 | 6/2001 | Wildgrube et al. | |
| 6,269,392 B1 | 7/2001 | Cotichini et al. | |
| 6,272,533 B1 | 8/2001 | Browne | |
| 6,272,637 B1 | 8/2001 | Little et al. | |
| 6,282,651 B1 | 8/2001 | Ashe | |
| 6,282,657 B1 | 8/2001 | Kaplan et al. | |
| 6,292,874 B1 | 9/2001 | Barnett | |
| 6,301,646 B1 | 10/2001 | Hostetter | |
| 6,314,409 B2 | 11/2001 | Schneck et al. | |
| 6,321,314 B1 | 11/2001 | Van Dyke | |
| 6,327,652 B1 | 12/2001 | England et al. | |
| 6,330,670 B1 | 12/2001 | England et al. | |
| 6,339,815 B1 | 1/2002 | Feng et al. | |
| 6,339,816 B1 | 1/2002 | Bausch | |
| 6,357,004 B1 | 3/2002 | Davis | |
| 6,363,485 B1 | 3/2002 | Adams | |
| 6,374,286 B1 * | 4/2002 | Gee et al. | 709/108 |
| 6,374,317 B1 | 4/2002 | Ajanovic et al. | |
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,379 B1 | 5/2002 | Yates, Jr. et al. | |
| 6,412,035 B1 * | 6/2002 | Webber | 710/261 |
| 6,421,702 B1 * | 7/2002 | Gulick | 709/102 |
| 6,445,797 B1 | 9/2002 | McGough et al. | |
| 6,463,535 B1 | 10/2002 | Drews et al. | |
| 6,463,537 B1 | 10/2002 | Tello | |
| 6,499,123 B1 | 12/2002 | McFarland et al. | |
| 6,505,279 B1 | 1/2003 | Phillips et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,981 B1 | 10/2003 | Davis | |
| 6,651,171 B1 | 11/2003 | England et al. | |
| 6,684,326 B1 | 1/2004 | Cromer et al. | |
| 2001/0021969 A1 | 9/2001 | Burger et al. | |
| 2001/0027527 A1 | 10/2001 | Khidekel et al. | |
| 2001/0037450 A1 | 11/2001 | Metlitski et al. | |
| 2003/0074548 A1 | 4/2003 | Cromer et al. | |
| 2003/0188179 A1 | 10/2003 | Challener et al. | |
| 2004/0117539 A1 | 6/2004 | Bennett et al. | |

FOREIGN PATENT DOCUMENTS

| | | |
|---|---|---|
| EP | 0 473 913 A2 | 3/1992 |
| EP | 0600112 | 8/1994 |
| EP | EP-EP0892521 | 1/1999 |
| EP | 0930567 A | 7/1999 |
| EP | EP-EP0961193 | 12/1999 |
| EP | EP-EP0965902 | 12/1999 |

| | | |
|---|---|---|
| EP | 1 030 237 A | 8/2000 |
| EP | EP-EP1055989 | 11/2000 |
| EP | EP-EP1056014 | 11/2000 |
| EP | EP-EP1085396 | 3/2001 |
| EP | 1146715 | 10/2001 |
| JP | 02000076139 A | 3/2000 |
| WO | WO-WO9524696 | 9/1995 |
| WO | WO97/29567 | 8/1997 |
| WO | WO-WO9812620 | 3/1998 |
| WO | WO9834365 A | 8/1998 |
| WO | WO9844402 | 10/1998 |
| WO | WO9905600 | 2/1999 |
| WO | WO9909482 | 2/1999 |
| WO | WO-WO9918511 | 4/1999 |
| WO | WO9957863 | 11/1999 |
| WO | WO-WO99/65579 | 12/1999 |
| WO | WO-WO0021238 | 4/2000 |
| WO | WO0062232 | 10/2000 |
| WO | WO 01/27723 A | 4/2001 |
| WO | WO 01/27821 A | 4/2001 |
| WO | WO-WO0163994 | 8/2001 |
| WO | WO 01 75564 A | 10/2001 |
| WO | WO 01/75565 | 10/2001 |
| WO | WO 01/75595 | 10/2001 |
| WO | WO-WO0201794 | 1/2002 |
| WO | WO 02 17555 A | 2/2002 |
| WO | WO-WO02060121 | 8/2002 |
| WO | WO 02 086684 A | 10/2002 |
| WO | WO-WO03058412 | 7/2003 |

OTHER PUBLICATIONS

Gum, P.H., "System/370 Extended Architecture: Facilities for Virtual Machines," IBM J. Res. Develop, vol. 27, No. 6, Nov. 1983, pp. 530-544.

Hall et al., "Virtualizing the VAX Architecture," ACM, pp. 280-389, 1991.

Liu et al., "Scheduling Algorithms for Multiprogramming in a Hard-Real-Time Environment," Journal of the Association for Computing Machinery, vol. 20, No. 1, Jan. 1973, pp. 46-61.

Stoica et al., "On the Duality between Resource Reservation and Proportional Share Resource Allocation," SPIE Proceedings Series, vol. 3020, pp. 207-214, Feb. 1997.

Jones et al., "CPU Reservations and Time Constraints: Efficient, Predictable Scheduling of Independent Activities," Proceedings of ACM SOSP, 1997, pp. 1-26.

Mercer et al., "Processor Capacity Reserves: Operating System Support for Multimedia Applications," Proc. IEEE Int'l Conf. on Multimedia Computing and Systems 1994, 10 pgs.

Rosenblum, M., "VMware's Virtual Platform: A Virtual Machine Monitor for Commodity PCs," Proc. of the 13th Ann. Computer Security Applications Conf., 1997, pp. 175-181.

Steere et al., "A Feedback-driven Proportion Allocator for Real-Rate Scheduling," Proc. of the 3rd USENIX Symposium on Operating Systems Design & Implementation, Feb. 1999, 14 pgs.

Heinrich, J., "MIPS R4000 Microprocessor User's Manual," Apr. 1, 1993, MIPS, Mt. View, XP002184449, pp. 61-97.

"M68040 User's Manual," 1993, Motorola, Inc., pp. 1-20.

"Intel 386 DX Microprocessor 32-Bit CHMOS Microprocessor With Integrated Memory Management," Dec. 31, 1995, Intel, Inc., pp. 32-56; figures 4-14.

Berg, C., "How do I Create a Signed Applet?," Dr. Dobb's Journal, M&T Publ., Redwood City, CA, US, vol. 22, No. 8, Aug. 1997, pp. 109-111, 122.

Gong, L., et al., "Going Beyond the Sandbox: An Overview of the New Security Architecture in the Java Development Kit 1.2," Proceedings of the Usenix Symposium on the Internet Technologies and Systems, Monterrey, CA Dec. 1997, pp. 103-112.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Aug. 9, 2001; pp. 1-31.

"Trust Computing Platform Alliance (TCPA)," Main Specification Version 1.1a, Compaq Computer Corporation, Hewlett-Packard Company, IBM Corporation, Intel Corporation, Microsoft Corporation, Dec. 2001.

Heinrich, J., "MIPS R4000 Microprocessor User's Manual," 1994, MIPS Technology, Inc., Mountain View, CA, pp. 67-79.

"Information Display Technique for a Terminate Stay Resident Program," IBM Technical Disclosure Bulletin, TDB-ACC-No. NA9112156, Dec. 1, 1991, pp. 156-158, vol. 34, Issue No. 7A.

Karger, Paul A., et al., "A VMM Security Kernel for the VA Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Brands, Stefan , "Restrictive Blinding of Secret-Key Certificates", Springer-Verlag XP002201306, (1995),Chapter 3.

Davida, George I., et al., "Defending Systems Against Viruses through Cryptographic Authentication", Proceedings of the Symposium on Security and Privacy, IEEE Comp. Soc. Press, ISBN 0-8186-1939-2,(May 1989).

Kashiwagi, Kazuhiko , et al., "Design and Implementation of Dynamically Reconstructing System Software", Software Engineering Conference, Proceedings 1996 Asia-Pacific Seoul, South Korea Dec 4-7, 1996, Los Alamitos, CA USA, IEEE Comput. Soc, US, ISBN 0-8186-7638-8,(1996).

Menezes, Oorschot , "Handbook of Applied Cryptography", CRC Press LLC, USA XP002201307, (1997),475.

Sherwood, Timothy , et al., "Patchable Instruction ROM Architecture", Department of Computer Science and Engineering, University of California, San Diego, La Jolla, CA, (Nov. 2001), 24-33.

Coulouris, George , et al., "Distributed Systems, Concepts and Designs", 2nd Edition, (1994),422-424.

Crawford, John , "Architecture of the Intel 80386", Proceedings of the IEEE International Conference on Computer Design: VLSI in Computers and Processors (ICCD '86), (Oct. 6, 1986),155-160.

Fabry, R.S. , "Capability-Based Addressing", Fabry, R.S., "Capability-Based Addressing," Communication of the ACM, vol. 17, No. 7, (Jul. 1974),403-412.

Frieder, Gideon , "The Architecture And Operational Characteristics of the VMX Host Machine", The Architecture And Operational Characteristics of the VMX Host Machine, IEEE, (1982),9-16.

Intel Corporation, "IA-64 System Abstraction Layer Specification", Intel Production Specification, Order No. 245359-001, (Jan. 2000),1-112.

Intel Corporation, "Intel IA-64 Architecture Software Developer's Manual", vol. 2: IA-64 System Architecture, Order No. 245318-001, (Jan. 2000),i, ii, 5.1-5.3, 11.1-11.8, 11.23-11.26.

Menezes, Alfred J., et al., "Handbook of Applied Cryptography", CRC Press Series on Discrete Mathematics and its Applications, Boca Raton, FL, XP002165287, ISBN 0849385237,(Oct. 1996),403-405, 506-515, 570.

Nanba, S. , et al., "VM/4: ACOS-4 Virtual Machine Architecture", VM/4: ACOS-4 Virtual Machine Architecture, IEEE, (1985),171-178.

RSA Security, "Hardware Authenticators", 1-2.

RSA Security, "RSA SecurID Authenticators", 1-2.

RSA Security, "Software Authenticators", 1-2.

Schneier, Bruce , "Applied Cryptography: Protocols, Algorithm, and Source Code in C", Wiley, John & Sons, Inc., XP002939871; ISBN 0471117099,(Oct. 1995),47-52.

Schneier, Bruce , "Applied Cryptography: Protocols, Algorithm, and Source Code in C", Wiley, John & Sons, Inc., XP002138607; ISBN 0471117099,(Oct. 1995),56-65.

Schneier, Bruce, "Applied Cryptography: Protocols, Algorithm, and Source Code in C", *Wiley, John & Sons, Inc.*, XP0021111449; ISBN 0471117099,(Oct. 1995),169-187.

Schneier, Bruce, "Applied Cryptography: Protocols, Algorithm, and Source Code in C", *2nd Edition; Wiley, John & Sons, Inc.*, XP002251738; ISBN 0471128457,(Nov. 1995),28-33; 176-177; 461-473; 518-522.

Robin, John S., et al., "Analysis of the Pentium's Ability to Support a Secure Virtual Machine Monitor", Proceedings of the 9th USENIX Security Symposim, XP002247347, Denver, Colorado, (Aug. 14, 2000), 1-17.

Saez, Sergio, et al., "A Hardware Scheduler for Complex Real-Time Systems," IEEE, Jul. 1999, pp. 43-48.

Luke, Jahn, "Replacement Strategy for Aging Avionics Computers," IEEE, Mar. 1999, pp. 7-11.

Richt, Stefan, et al., "In-Circuit-Emulator Wird Echtzeittauglich," Elektronik, vol. 40, No. 16, Aug. 6, 1991, pp. 100-103.

International Search Report from PCT Application No. PCT/US 01/08066, International filing date Mar. 13, 2001.

\* cited by examiner

VM Resource Requirements

| Virtual Machine | $X_i$ | $Y_i$ |
|---|---|---|
| A | 20% | 10 |
| B | 50% | 2 |
| C | 25% | 4 |

510

Schedule for above VM Resource Requirements

| B | C | B | A | B | C | B | A | B | C | B | A | B | C | B | X |
|---|---|---|---|---|---|---|---|---|---|---|---|---|---|---|---|

REAL-TIME SCHEDULING OF VIRTUAL MACHINES

BACKGROUND

1. Field

This disclosure relates to virtual machines and, more particularly, to real-time computations within virtual machines.

2. Background Information

Virtual computing machines, which are commonly referred to as virtual machines (VMs) have typically been employed in a number of specific situations. A virtual machine may emulate, for example, a processor or microprocessor. VMs, at a high level, are typically software implementations of electronic hardware. Current embodiments of VMs are typically employed in batch-processing, time-sharing applications and security applications. Other uses of VMs include emulating hardware that may still be in development and not yet implemented. Such a use of a VM may be useful in debugging hardware during its development prior to actual implementation. This use of a VM may reduce development time and cost for the hardware that is being emulated in software. In this regard, a processor, which may currently be in development, could be implemented as a VM by employing a system that embodies a prior generation processor.

Prior implementations of VMs may be referred to as non-real-time. "Non-real-time," in this context, means that a VM operates without any requirement that any specific computation or operation is accomplished by a well-defined deadline. Contrariwise, "real-time" means, in this context, that computations or operations upon data available at one substantially predetermined time are to be completed by another substantially predetermined time, which may be referred to as a deadline, as previously indicated. Typically, real-time applications comprise a hierarchy of such deadlines.

Emerging technologies, such as, for example, multimedia applications, typically contain real-time subsystems. These subsystems may include software components that employ such real-time deadlines. These deadlines, typically, would need to be met for such applications to function satisfactorily. Therefore, a need may exist for virtual machine configurations that may be employed for use with such technologies.

BRIEF DESCRIPTION OF THE DRAWINGS

The subject matter regarded as the invention is particularly pointed out and distinctly claimed in the concluding portion of the specification. The invention, the however, both as to organization and method of operation, together with objects, features, and advantages thereof, may best be understood by reference to the following detailed description when read with accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As was indicated above, virtual machines (VMs) have typically been employed in time-sharing and batch processing applications. Additionally, VMs have been employed in security applications as well. The use of virtual machines is, of course, not limited to these situations and the foregoing are provided only by way of example. Current VMs, however, are not adequate to support real-time applications. As the processing capability of computing systems and use of real-time applications, such as multimedia applications, increase, techniques for employing VMs for use with real-time applications are desirable.

Figure 6:
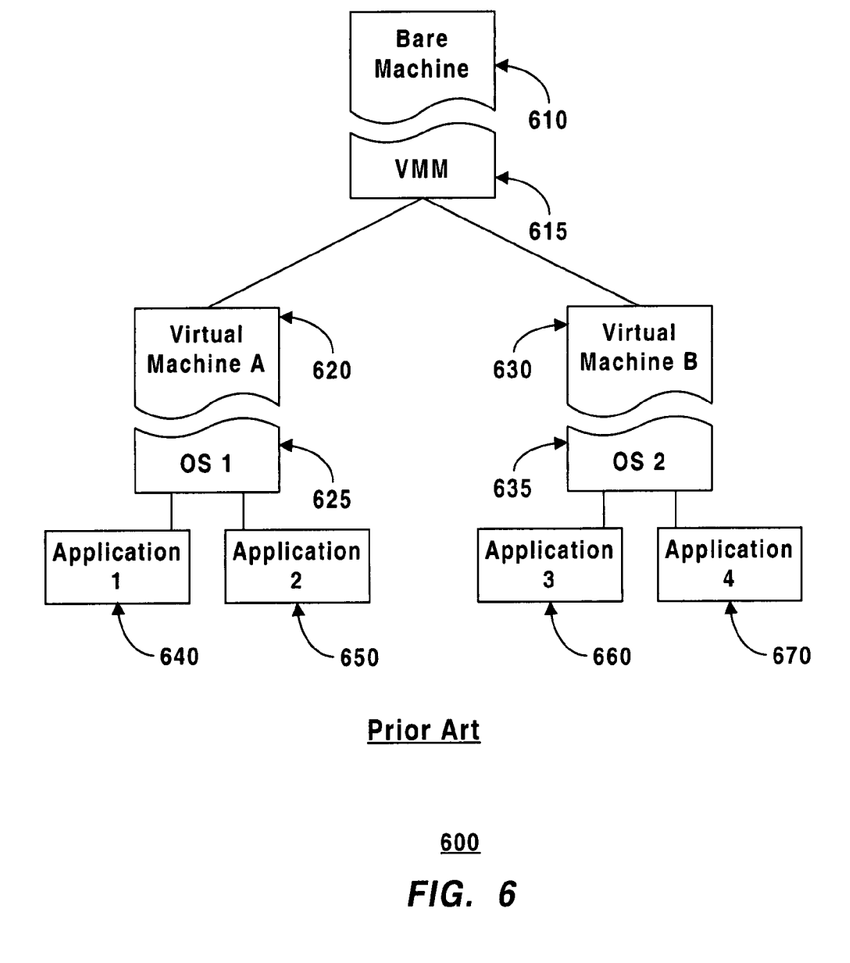
FIG. 6 is a block diagram illustrating a prior art embodiment of a virtual machine configuration.

FIG. 6 illustrates a prior art embodiment, 600, of a virtual machine configuration that may be employed in batch or time-sharing applications, as previously discussed. In this particular embodiment, bare machine 610 comprises a computing platform, such computing platforms or systems typically comprise electronic hardware. This hardware may be capable, for example, of executing a standard operating system (OS) or a virtual machine monitor (VMM), such as 615. Such a VMM, though typically implemented in software, may export a bare machine interface, such as an emulation, to higher level software. Such higher level software may comprise a standard or real-time OS, although the invention is not limited in scope in this respect and, alternatively, for example, a VMM may be run within, or on top of, another VMM. VMMs and their typical features and functionality are well-known by those skilled in the art and may be implemented, for example, in software, firmware or by a combination of various techniques.

In such prior art embodiments, a VMM, at a minimum, typically schedules the VMs. This scheduling may allow the VMs to share the computing resources of, for example, bare machine 610. Such scheduling is typically done with static or predetermined allocation sequences. For example, VM A 620 may be allocated 25 percent of bare machines 610's computing resources and VM B 630 may be allocated 75 percent of bare machine 610's computing resources. However, the actual allocation may vary and depend, at least in part, on the particular embodiment and the applications being run within the VMs. In such an embodiment, the actual computing resource requirements of the VMs are not accessible to the VMM. Additionally, VM A 620 and VM B 630 are typically configured such that the VMs would not interface with one another. In this respect, the VMs are configured such that it is not apparent to each VM that the bare machine resources are being shared. As part of scheduling VM A 620 and VM B 630 in this embodiment, VMM 615 is capable of suspending one VM and retaining information necessary for restarting that VM. For example, at the end of a period of time that VM A 620 is utilizing the bare machine's computing resources, VMM 615 may suspend VM A 620's activities, store data related to the current activities of VM A 620, restore data related to a prior suspension of VM B 630 and allocate, or schedule, VM B its 75% share of bare machine 610's computing resources, for this example. However, scheduling percentages in such an embodiment are not guaranteed over any specific time period. In this respect, for this embodiment, VM A or VM B may not receive any share of bare machine 610's computing resources over a specific period of time due to, for example, contention for various resources, such as a disk drive, as one example.

In this particular embodiment, each VM would then allocate its share of bare machine 610's computing resources to any user applications running in that particular VM, such as application 1 640 and application 2 650 for VM A 620, for example. In this context, user applications are software that may be used for example, by a personal computer user. An example of such a user application may be a word processing program, as one example. As was previously indicated, because VMM 615 typically does not have access to information regarding how each VM allocates its share of computing resources, scheduling of the VMs to achieve real-time deadlines, such as displaying a certain number of frames of a video clip in a certain period of time, is problematic.

Figure 4:
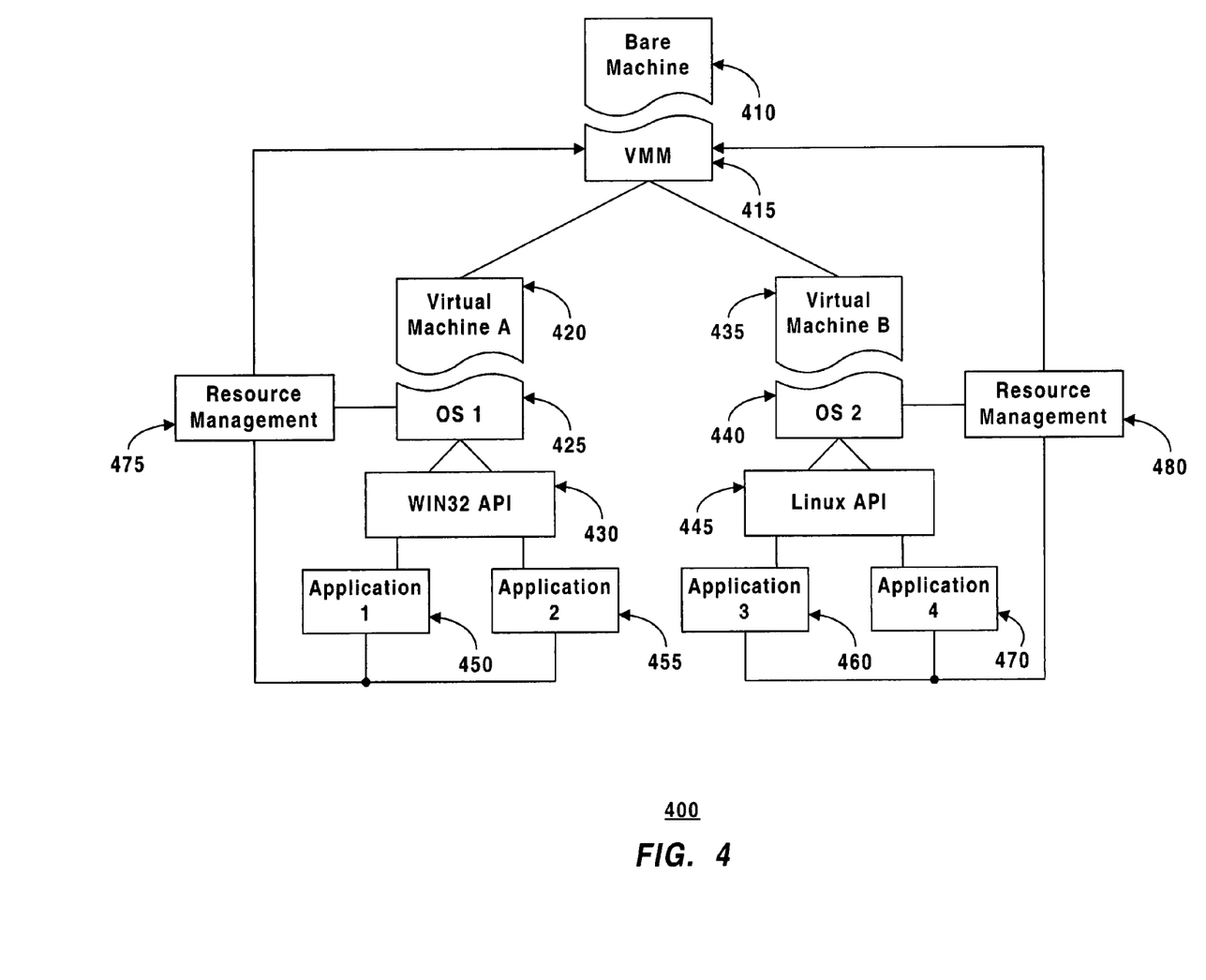
FIG. 4 is a block diagram illustrating an embodiment of a virtual machine configuration in accordance with the invention.

FIG. 4 illustrates an embodiment, 400, of a virtual machine configuration that may be employed by embodiments of methods of real-time scheduling in accordance with the invention. The virtual machine configuration illustrated by embodiment 400 comprises an interface, which may be implemented in software. This interface may, for example, couple OS 1 425, application 1 450 and application 2 455 to VMM 415. In this particular embodiment, this interface further comprises a resource management application, such as 475 or 480, although the invention is not limited in scope to use of such resource management applications, and embodiments without such a resource management application may exist. Resource management applications are well known in the art and the invention is not limited in scope to the use of any particular resource management application, nor to the use of a resource management application at all. In such embodiments, scheduling information, which is discussed in more detail hereinafter, may be communicated to a VMM, such as 415, from an OS, an application programming interface (API); such as APIs 430 and 445, a user application, or a resource management application.

In embodiments such as 400, an OS, API, user application or resource management application may communicate one or more parameters that may be used by a scheduler embodied in a VMM, such as 415 to schedule VMs such that real-time deadlines of applications executing within a VM may be met. For such an embodiment, when employed by a method in accordance with the invention, it is assumed that computing activities in the VMs are typically event driven and that device interrupts are typically the root-level events upon which such computing activities are, at least in part, based. Thus real-time scheduling of VMs is typically based on such interrupts. These interrupts are typically periodic and, for example, may be a clock interrupt or video display interrupt. The invention is, of course, not limited in scope to these particular interrupts, nor the to use of any particular interrupts.

In such embodiments of methods in accordance with the invention, it is assumed that computing activities in VMs are typically interrupt driven, as was previously indicated, and that real-time scheduling of VMs is typically based on periodic interrupts. One embodiment of such a method for scheduling VMs may comprise the following. A user application, OS, API, or resource management application may communicate a resource requirement ($X_i$) and an interrupt period ($Y_i$) for each interrupt source, although the invention is not limited in scope in this respect. Alternatively, for example, each $X_i$ and $Y_i$ may correspond to a specific VM. In this respect, the subscripts, i, for X and Y may, for example, correspond to a respective interrupt or VM, although the invention is not limited in scope in this respect. For such embodiments $X_i$ may be expressed as a percentage of the computing resources of a bare machine, such as 410 and $Y_i$ may be expressed as the frequency at which the resource requirement should be allocated. For example, a resource management application, such as 475, may communicate to the VMM a $X_i$ of 20 and a $Y_i$ of 10. This may then indicate to a scheduler embodied in such a VMM that it is desirable that this particular VM receive, for example, 2 microseconds (μS) of computing resources every 10 μS.

In such embodiments, a VMM would schedule VMs based, at least in part, on the various $X_i$ and $Y_i$ values communicated to it by, for example, a resource management application, such as 475. This scheduling may be accomplished by employing a number of different real-time scheduling techniques. Such techniques are well-known in the art and the invention is not limited in scope to any particular technique for scheduling VMs. For this particular embodiment, a VMM may suspend VMs and initiate allocations of computing resources to VMs in a substantially similar manner as was previously described with regard to embodiment 600.

Figure 5:
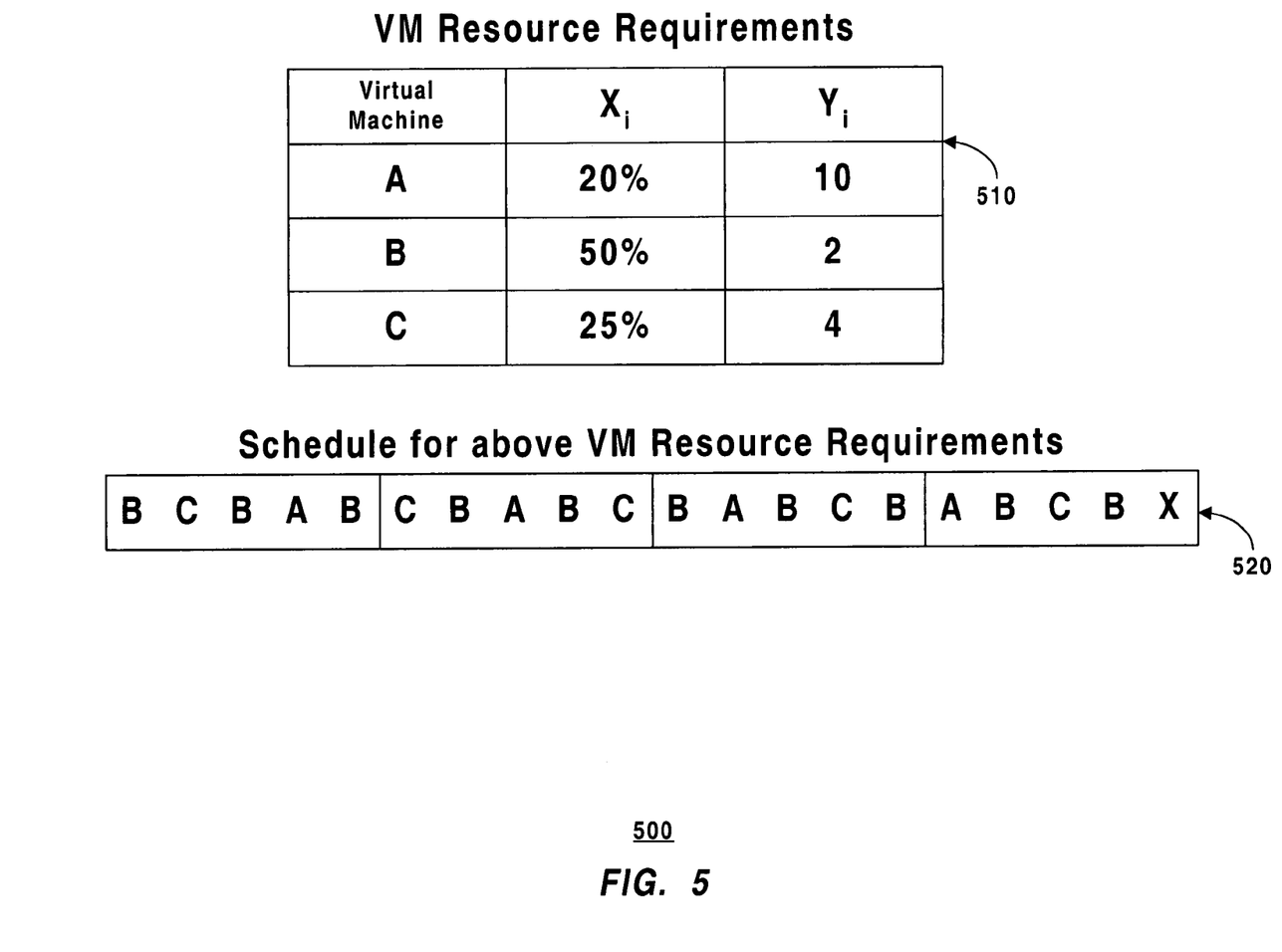
FIG. 5 is tables illustrating an embodiment of a real-time schedule for embodiments of virtual machine configurations in accordance with the invention, such as illustrated in FIG. 4, for example.

FIG. 5 illustrates an embodiment of a schedule for a particular set of $X_i$ and $Y_i$ values for an embodiment employing three VMs, A, B and C. In FIG. 5, table 510 indicates the respective $X_i$ and $Y_i$ values for VMs A, B and C. Table 520 indicates an embodiment of a schedule that may result from a real-time scheduling technique employed in a VMM scheduler. For ease of explanation, $Y_i$ values will be expressed in terms of μS. For this particular scenario, VM A's resource requirements, which may be referred to as $X_A$, are 20% every 10 μS, which, likewise, may be referred to as $Y_A$. Similarly, VM B's resource requirements, $X_B$, are 50% every 2 μS, or $Y_B$, and VM C's resource requirements, $X_C$, are 25% every 4 μS, or $Y_C$. Simplifying this scenario, VM A's real-time resource requirements are 2 of every 10 μS, VM B's real-time resource requirements are 1 of every 2 μS and VM C's real-time resource requirements are 1 of every 4 μS. The real-time schedule illustrated in table 520 satisfies the resource requirements indicated by these respective $X_i$ and $Y_i$ values and may, therefore, be used to schedule the respective VMs.

An alternative embodiment of a method for real-time scheduling of VMs in accordance with the invention that may employ an embodiment such as 400 may comprise the following. Rather than communicating both $X_i$ and $Y_i$ values from an OS, user application, API, or resource management application, such an embodiment may communicate $X_i$ values in such a manner and employ a technique for determining the interrupt period, $Y_i$, such as the technique illustrated in FIG. 1. In this particular embodiment, 100, interrupts 115 are communicated from hardware (H/W), e.g. a bare machine or devices 110, to a H/N interrupt virtualizer, such as 120. H/W interrupt virtualizer 120 may perform various functions. Of course, the invention is not limited in scope to any particular H/W interrupt virtualizer configuration. For this embodiment, however, H/W interrupt virtualizer 120 may filter known aperiodic interrupts, as was previously indicated as desirable. Such known aperiodic interrupts typically include interrupts from, for example, disk drives, keyboards and pointing devices, although the invention is not limited in scope to these particular aperiodic interrupts. HAN interrupt virtualizer 120 may also communicate virtualized interrupts to an appropriate VM. In this particular embodiment, as is typical when employing VMs, the VMs would handle such virtualized interrupts as though they were actual hardware interrupts. It is desirable that VMs handle virtualized interrupts as actual hardware interrupts, at least in part, due to the fact that VMs are typically configured such that it is not apparent to an individual VM that computing resources are being shared. H/W interrupt virtualizer 120 may communicate all interrupt not known to be aperiodic, such as previously discussed, to interrupt period detector (IPD) 130. Certain interrupts, of the interrupts not known to be aperiodic, may appear periodic for a given duration, then may change their period or become non-periodic. That is, these interrupts typically do not have a substantially consistent periodicity. IPD 130, for this embodiment, may be capable of rejecting such aperiodic interrupts, and therefore, the VMM may not consider such interrupts in scheduling VMs 140 and 150, for example.

Figure 1:
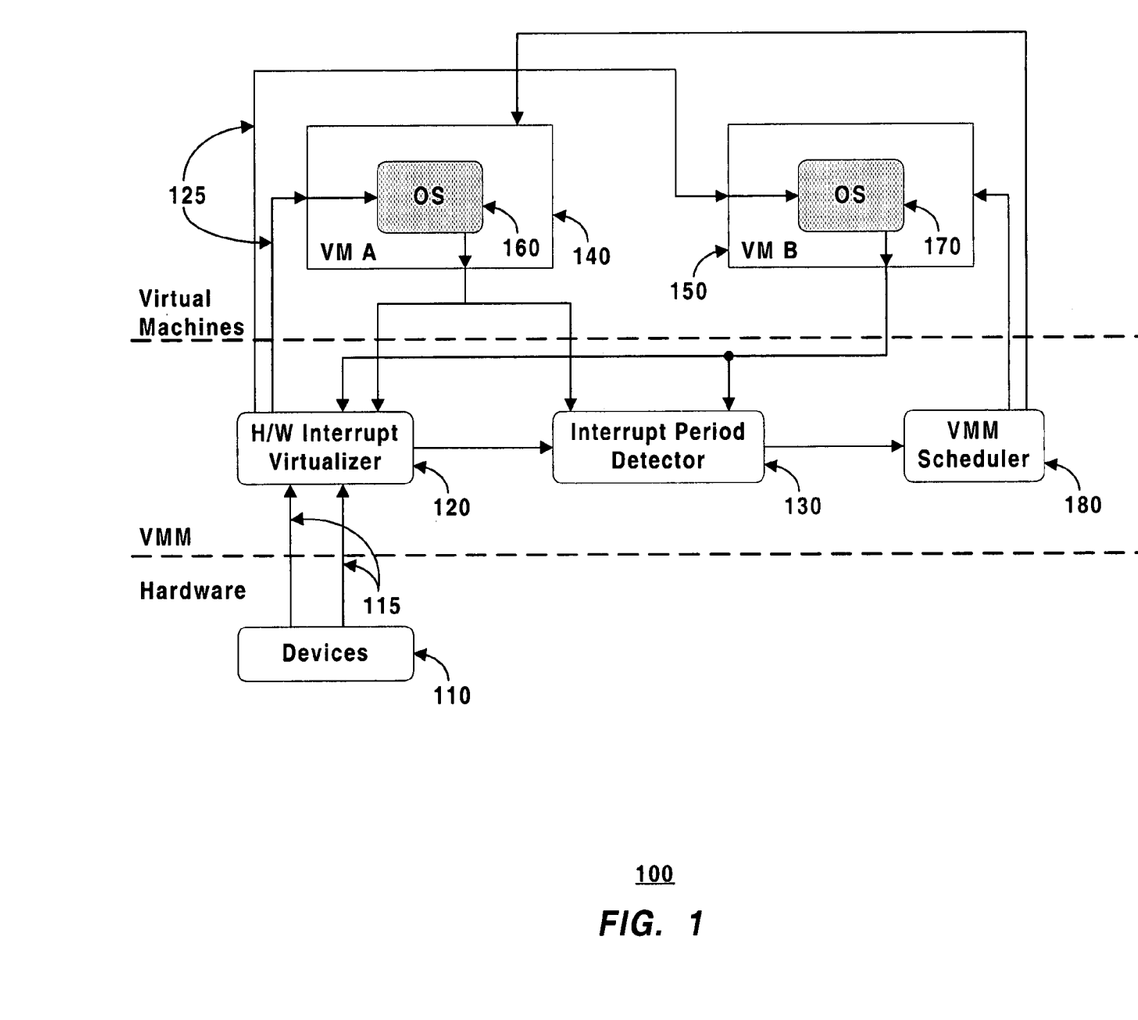
FIG. 1 is a block diagram illustrating an embodiment for determining interrupt periodicity, Y, in embodiments of virtual machine (VM) configurations in accordance with the invention.

For this particular embodiment, IPD 130 may then, in turn, iteratively determine $Y_i$ based, at least in part, on interrupt information from H/W interrupt virtualizer 120, VM A 140 and VM B 150. In this regard, IPD 130 may comprise a state machine, such as 200 illustrated in FIG. 2. For this embodiment, such a state machine may be employed for each virtualized interrupt and may be implemented in software, although the invention is not limited in scope in this respect. It may be desirable, in employing such a state machine in this manner, to initialize the state machine with an approximate $Y_i$. Such initialization may decrease the time employed to converge on an actual $Y_i$ for a given interrupt. This decreased convergence time may, in turn, improve the overall performance of a virtual machine scheme employing such an embodiment. State machines, such as 200, are well-known in the art, although, of course, the invention is not limited in scope to any particular state machine configuration or to the use of a state machine at all.

Figure 2:
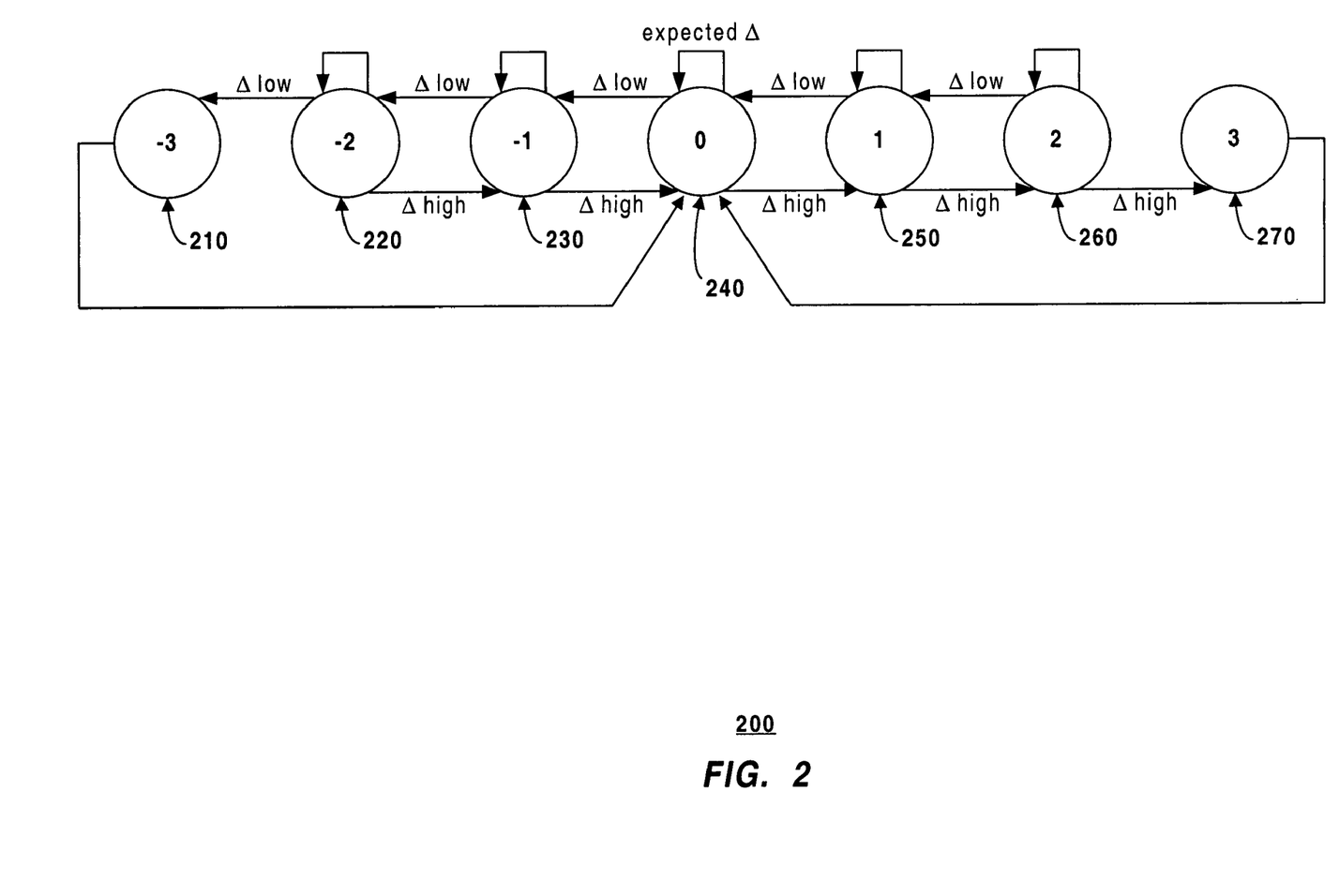
FIG. 2 is a block diagram of an embodiment of a state machine that may be employed by the embodiment of FIG. 1, for example.

As previously indicated, for this embodiment, the state machine illustrated in FIG. 2 may be employed to converge on an actual $Y_i$ for a given interrupt. As was also indicated above, it is desirable to initialize such a state machine with an estimated $Y_i$ value for each interrupt. For a given interrupt in such an embodiment, the state machine would initially be at state 0, indicated in FIG. 2 by element 240. If the expected $Y_i$ value, which may be an initialized value, is less than an actual $Y_i$ value, state machine 200 may then transition to state 1, indicated by element 250. For this particular embodiment, if the next actual $Y_i$ matches the expected $Y_i$, then state machine 200 would persist in state 1, for this specific situation, while if the expected $Y_i$ is greater than the next actual $Y_i$, the state machine would then transition back to state 0. However, if the expected $Y_i$ is again less than the subsequent actual $Y_i$, state machine 200 may then transition to state 2, indicated by element 260. In similar fashion, if the next actual $Y_i$ value matches the expected $Y_i$, then state machine 200 would persist in state 2, for this specific situation, while if the expected $Y_i$ is greater than the next actual $Y_i$, the state machine would then transition back to state 1. However, if the expected $Y_i$ is again less than the subsequent $Y_i$, state machine 200 may then transition to state 3, indicated by element 270 and the expected $Y_i$ may be adjusted upward and state machine 200 would then transition back to state 0. This upward adjustment could be a fixed value or alternatively a percentage of the previously expected $Y_i$. The invention is, of course, not limited in scope to any particular technique for adjusting the expected $Y_i$ in such an embodiment. Continuing such an iterative process would allow IPD 130 to converge on an actual $Y_i$ for periodic interrupts.

A substantially similar iterative process may occur for a situation when an expected $Y_i$ is greater than an actual $Y_i$ for a given interrupt with transitions to states −1, −2 and −3, respectively indicated by elements 230, 220 and 210. For this embodiment, such transitions would result in corresponding downward adjustments in the expected $Y_i$ and transitions back to state 0. While the invention is not limited in scope to determining an expected $Y_i$ value in this manner and alternative techniques may exist, this technique is advantageous as it may be tolerant of minor variations in a periodic interrupt signal. Such variations are commonly referred to as signal jitter and are well-known to those of skill in the art.

Embodiments of IPDs, such as 130, may also employ a number of techniques for rejecting aperiodic interrupts. In such embodiments, such a rejection technique may override a $Y_i$ determined by a state machine associated with an aperiodic interrupt and prevent IPD 130, in this particular embodiment, from communicating such a $Y_i$ to a VMM scheduler, for example. In this specific situation, a schedule generated by a VMM scheduler, such as 180 may not depend on aperiodic interrupts, as is desired. Various techniques for rejection of aperiodic interrupts exist, and the invention is not limited in scope to any particular technique for such rejection. Alternatively, for example, such rejection may be performed by H/W interrupt virtualizer 120.

Embodiments for scheduling VMs in accordance with the invention that employ techniques such those described above with respect to FIG. 1 may schedule VMs using real-time scheduling techniques based, at least in part, on the $X_i$ values communicated from VMs, as previously described, and $Y_i$ values that may be determined by the foregoing technique. The invention is, of course, not limited in scope to the particular techniques described and alternative manners of determining $Y_i$ may exist. Such embodiments may be employed, for example, when implementing a VM that may include a specialized instruction set. Though the invention is not limited in scope in this respect, such a VM may emulate, for example, a digital signal processor (DSP). Because such VMs typically have substantially static computing resource requirements, use of the foregoing embodiment of real-time scheduling of VMs may be advantageous as a static computing resource requirement may be communicated to a VMM by such a VM, which, for this embodiment, may be expressed as $X_i$.

Figure 3:
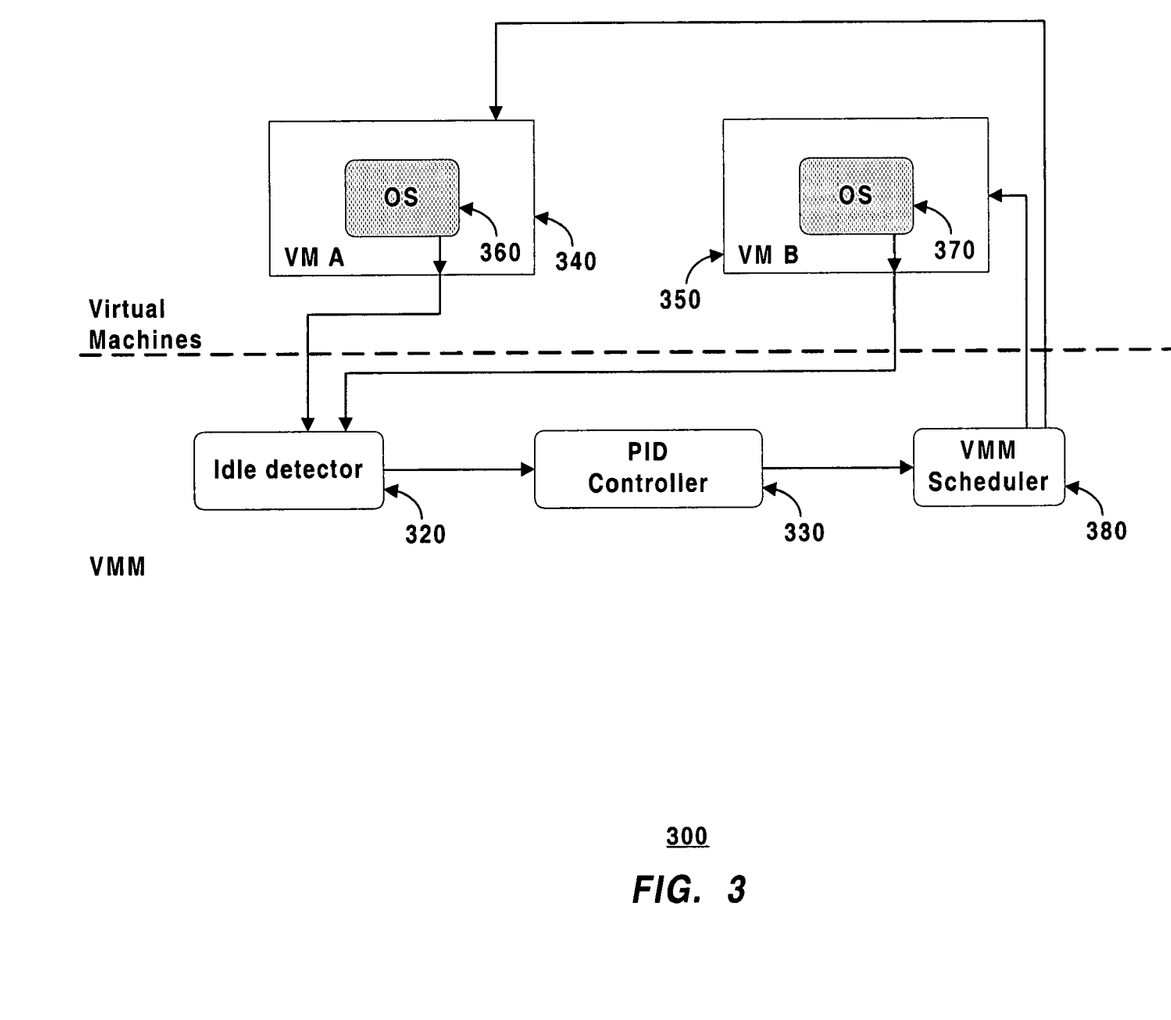
FIG. 3 is a block diagram illustrating an embodiment of a feedback loop that may be employed for determining VM resource requirements in accordance with the invention.

While the embodiments described above may address the desire to allow real-time scheduling of virtual-machines, an interface for communicating $X_i$ and $Y_i$ may result in a custom implementation of both a VMM and any corresponding VMs implemented by such an embodiment. FIG. 3 illustrates an embodiment, 300, employing a VMM that may allow real-time scheduling of virtual machines without the addition of such an interface. This particular embodiment comprises a VMM that includes a proportional integral derivative (PID) controller, 330, and an idle detector, 320, both of which may be implemented in software, for example. PID controllers, such as 330, are typically employed in feedback loops, such as 300, and are well-known by those skilled in the art. While the invention is not limited in scope to the use of any particular configuration of a PID controller, or the use of a PID controller at all, in this particular embodiment, PID controller 330 may be employed in determining a resource requirement value, $X_i$, for VMs A and B, designated 340 and 350 respectively.

In this particular embodiment, an idle detector 320 may also be employed to determine whether the VMs are achieving their real-time deadlines with the computing resources they are allocated. OSs typically employ an idle loop, and such loops are well known in the art. Such an idle loop may be indicated by a halt instruction (HLT), which then may be trapped by the VMM in an idle detector, for example. Such trapping may indicate to a VMM that a VM has encountered an idle loop and that, for example, an OS executing within the VM has no useful work to do. Of course, the invention is not so limited in scope and alternative methods of providing such an indication may exist. Alternatively, as one example, the VM may load a specific application that executes at relatively to low priority to, for example, any real-time applications. Such a specific application may then issue a predefined illegal instruction. Such an instruction may then, in turn, be used to indicate to the VMM that the VM has received a sufficient allocation of computing resources for real-time applications. In this respect, a VM may still have useful non-real-time work to do. Such a technique may also be employed to more efficiently allocate computing resources in certain embodiment or certain situations.

For this embodiment, if a VM does not reach the idle loop, that is does not issue a HLT, during its computing resource allocation, this may indicate to PID controller 330 an increase in computing resource allocation is desired for that particular VM. Conversely, if a VM reaches the idle loop, e.g. issues a HLT, before the completion of its computing resource allocation, this may indicate to PID controller 320 that a decrease in computing resource allocation is desired, for this embodiment. Although the invention is not limited in scope in this respect, it may be advantageous to target reaching an idle loop at some predetermined point during a given computing resource allocation such as, for example, 95%. Such a target may be advantageous as it may allow real-time deadlines to be achieved while reducing the amount of unutilized computing resources consumed by idle loops. Also, employing methods such as the foregoing may reduce overall power consumption in virtual machine schemes employing such methods. This reduction in power consumption may result, for example, at least in part, from more efficient use of computing resources in such a virtual machine scheme.

In embodiments such as 300, it may be advantageous to initialize the PID controller with an estimated computing resource allocation. This may be advantageous as it may reduce the convergence time for such a feedback loop to establish a $X_i$ that may allow VMs, such as 340 and 350, to achieve their real-time deadlines consistently. Reduction of convergence time for determining a specific $X_i$ may also be advantageous as it may improve overall performance of a VM scheme employing embodiments such as feedback loop 300. Embodiments such as this are also potentially advantageous, as they may allow real-time scheduling of virtual machines while being substantially transparent to an OS executing in a VM. In this context, transparent means that an OS and any user applications running under that OS may not need additional software interfaces to communicate with, for example, a VMM, such as previously discussed with respect to embodiment 400.

Figure 7:
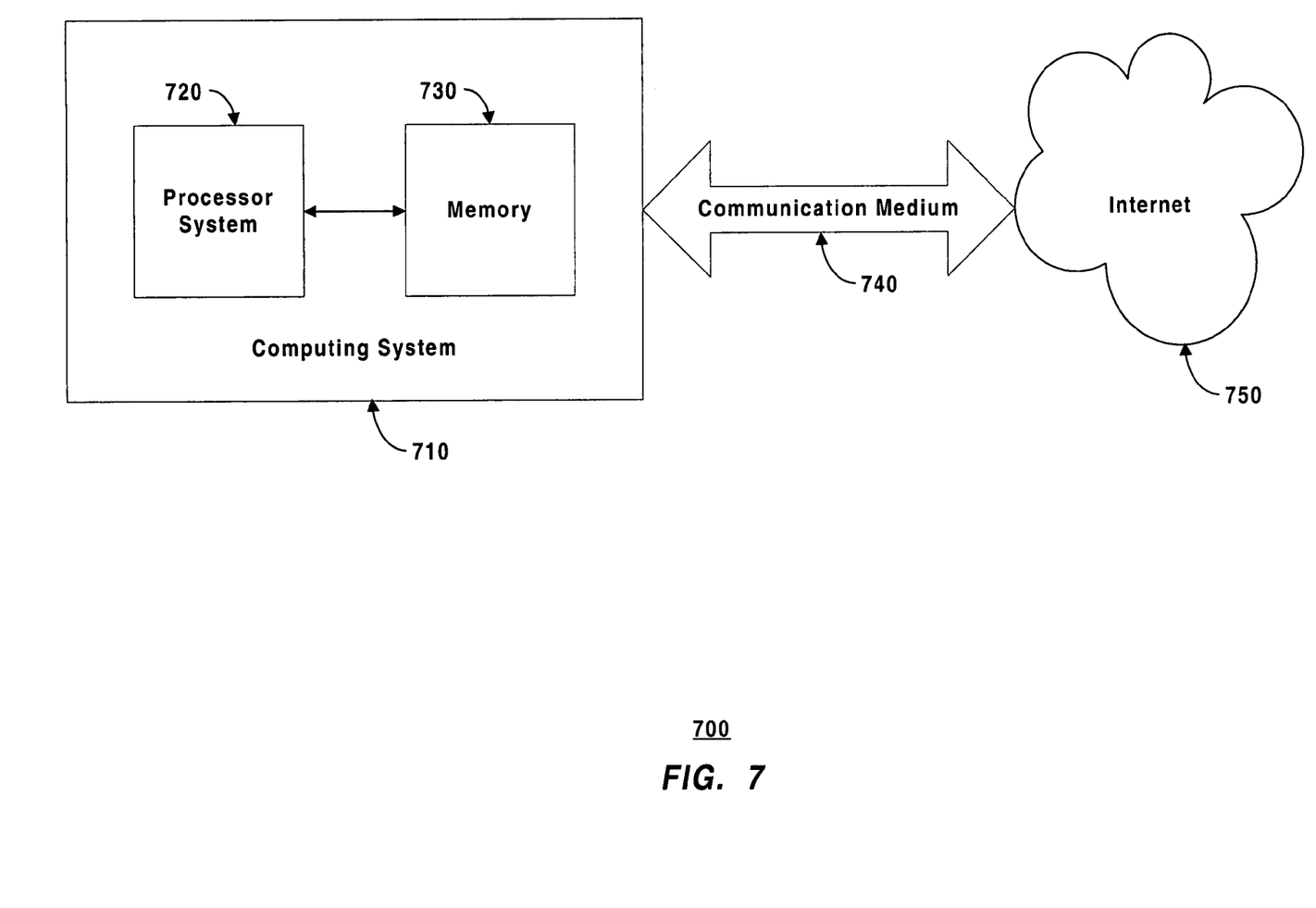
FIG. 7 is an embodiment of a virtual machine configuration utilizing a computer readable medium.

An article in accordance with the invention may comprise, for example, a computer readable medium capable of storing instructions that when executed by a computing system may schedule VMs based on a resource requirement and an interrupt period, such as previously discussed. One embodiment of a configuration in which such an article may be employed is illustrated in FIG. 7, although, of course, the invention is not limited in scope to this, or any particular configuration. However, such articles may be employed as a memory, such as 730. In this particular embodiment, such memory, which is well-know to those of skill in the art, may comprise, as some examples, a compact disk read only memory (CDROM), a disk-drive, a digital versatile disk (DVD), static random access memory (SRAM); such as cache memory, or any number of various dynamic RAM (DRAM) configurations. Such DRAM may include synchronous DRAM (SDRAM), extended data-out (EDO) DRAM, or double data rate (DDR) DRAM. The invention is, of course, not limited in scope to these particular configurations, or examples of memory devices.

In the embodiment illustrated in FIG. 7, instructions stored on/in such a memory for scheduling VMs may be executed by the processor system, 720, of computing system 710. Computing system 710 is also coupled to the Internet, 710, via communications medium 740, although the invention is not so limited. Both the Internet and such communication media are well known in the art. Examples of such communication media may include, though are not limited to, modem connections, digital subscriber line (DSL) connections and broadband network access connections. In this respect, instructions, such as those previously described, may be obtained from the Internet via communications medium 740 for execution by processor system 720. Such instructions may be stored, either temporarily or substantially permanently in the memory and then executed, as was previously discussed. The invention is, of course, not limited in scope in this respect and alternatively, for example, such instructions may be downloaded from the Internet and executed without employing memory 730. In such a situation, a computing system included in the Internet from which such instructions are obtained may be analogous in function, for this embodiment, to memory 730.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A computerized method for scheduling a plurality of virtual machines comprising:

determining a respective resource requirement for each virtual machine comprises communicating said resource requirement from an application running within an operating system running within a respective virtual machine, said application is a resource management application, which dynamically maintains said respective resource requirement;

determining a respective interrupt period for each virtual machine based on estimating the respective interrupt period for periodic interrupts and converging the respective interrupt period to be substantially equal to actual periods for the periodic interrupts; and scheduling said plurality of virtual machines based, at least in part, on said respective resource requirement and interrupt period values.

2. The method of claim 1 wherein, determining said respective resource requirement and interrupt period comprises communicating said respective resource requirement and interrupt period from an operating system running within said respective virtual machine.

3. The method of claim 1 wherein, determining said resource requirement and said interrupt period comprises communicating said resource requirement and said interrupt period from said application running within said operating system running within said respective virtual machine.

4. A computerized method for scheduling a plurality of virtual machines comprising:
   determining a respective resource requirement for each virtual machine comprises:
      monitoring whether a virtual machine reaches an idle loop,
      increasing said respective resource requirement if said idle loop is not reached, and
      decreasing said respective resource requirement if said idle loop is reached before a predetermined percentage of said resource requirement has been utilized;
   determining a respective interrupt period for each virtual machine based on estimating the respective interrupt period for periodic interrupts and converging the respective interrupt period to be substantially equal to actual periods for the periodic interrupts; and
   scheduling said plurality of virtual machines based, at least in part, on said respective resource requirement and interrupt period values.

5. A computerized method for scheduling a plurality of virtual machines comprising:
   determining a respective resource requirement for each virtual machine;
   determining a respective interrupt period for each virtual machine, said determining respective interrupt period values comprises:
      filtering non-periodic interrupts,
      rejecting aperiodic interrupts,
      estimating said respective interrupt period values for periodic interrupts, and
      converging said respective interrupt period values to be substantially equivalent to actual periods for said periodic interrupts; and
   scheduling said plurality of virtual machines based, at least in part, on said respective resource requirement and interrupt period values.

6. An article comprising: a storage medium having stored thereon instructions that, when executed, result in a computing platform having the capability to:
   acquire resource requirements for a plurality of virtual machines from the plurality of virtual machines;
   determine a respective resource requirement by detecting an occurrence of an idle loop within a virtual machine of said plurality of virtual machines and adjusting a resource requirement based, at least in part, on whether said idle loop occurs; and
   schedule said plurality of virtual machines implemented in said computing platform based, at least in part, on said respective resource requirement and a respective interrupt period for each of said plurality of virtual machines.

7. The article of claim 6, wherein said instructions, when executed result in the capability to acquire said respective resource requirements from applications running within said plurality of virtual machines.

8. The article of claim 7, wherein said instructions, when executed result in the capability to acquire said respective interrupt periods from applications running within said plurality of virtual machines.

9. The article of claim 6, wherein said instructions, when executed result in the capability to acquire said respective resource requirements and said respective interrupt periods from operating systems running within said plurality of virtual machines.

10. The article of claim 6, wherein said instructions, when executed result in the capability to acquire said respective resource requirements and said respective interrupt periods from a resource management applications running within said plurality of virtual machines.

11. The article of claim 6, wherein said instructions, when executed result in the capability to determine said respective interrupt period by comparing an expected interrupt period with an actual interrupt period and adjusting said respective interrupt period based, at least in part, on said comparison.

12. A computerized method for determining interrupt period values comprising:
   initializing said interrupt period values for a plurality of virtual machines;
   adjusting said interrupt period values of said plurality of virtual machines iteratively until substantially equivalent to actual interrupt periods; and
   acquiring resource requirement values for said plurality of virtual machines from said plurality of virtual machines, including
      initializing said resource requirement values, and
      adjusting said resource requirement values iteratively based, at least in part, on a determination of whether each virtual machine of the plurality of virtual machines executed a respective predetermined instruction.

13. The method of claim 12, further comprising:
   scheduling said plurality of virtual machines to achieve real-time deadlines based, at least in part, on said interrupt period values and resource requirement values.

14. A computerized method for determining interrupt period values comprising:
   initializing said interrupt period values;
   generating virtualized interrupts by virtualizing hardware interrupts;
   filtering known non-periodic interrupts;
   rejecting detected aperiodic interrupts;
   adjusting said interrupt period values iteratively until substantially equivalent to actual interrupt periods;
   acquiring resource requirement values, said resource requirement values are acquired from a plurality of virtual machines; and
   scheduling said plurality of virtual machines to achieve real-time deadlines based, at least in part, on said interrupt period values and resource requirement values.

15. The method of claim 12, wherein adjusting said resource requirement values comprises:
   increasing said resource requirement values if execution of said respective predetermined instruction does not occur;

decreasing said resource requirement values if execution of said respective predetermined instruction occurs prior to a target time; and scheduling said plurality of virtual machines based, at least in part, on said interrupt period values and said resource requirement values.

16. An article comprising: a storage medium having stored thereon instructions that, when executed, result in a computing system having the capability to:

initialize interrupt period values for a plurality of virtual machines;

adjust said interrupt period values iteratively until substantially equivalent to actual interrupt periods;

increasing resource requirement values if a respective predetermined instruction does not occur;

decreasing said resource requirement values if said respective predetermined instruction occurs prior to a target time; and scheduling said plurality of virtual machines based, at least in part, on said interrupt period values and said resource requirement values.

17. The article of claim 16, wherein said instructions, when executed, further result in the capability to:

schedule said plurality of virtual machines to achieve real-time deadlines based, at least in part, on said interrupt period values and said resource requirement values.

18. The article of claim 16, wherein said instructions, when executed, result in said computing system having the further capability to:

initialize said resource requirement values; and adjust said resource requirement values iteratively based, at least in part, on a determination of an occurrence of said predetermined instruction.

19. The article of claim 18, wherein adjusting said resource requirement values comprises:

increasing said resource requirement values if said respective predetermined instruction does not occur;

decreasing said resource requirement values if said respective predetermined instruction occurs prior to a target time; and scheduling a plurality of virtual machines based, at least in part, on said interrupt period values and said resource requirement values.

20. An article comprising: a storage medium having stored thereon instructions that, when executed, result in a computing system having the capability to:

initialize interrupt period values;

generate virtualized interrupts by virtualizing hardware interrupts;

filter known non-periodic interrupts;

reject detected aperiodic interrupts;

adjust said interrupt period values iteratively until substantially equivalent to actual interrupt periods;

acquire resource requirement values, said resource requirement values are acquired from a plurality of virtual machines; and schedule said plurality of virtual machines to achieve real-time deadlines based, at least in part, on said interrupt period values and said resource requirement values.

21. A system comprising:

a computing platform;

said computing platform being adapted to implement, at least, a virtual machine monitor and a plurality of virtual machines;

said virtual machine monitor being capable of scheduling said virtual machines to execute real-time applications based, at least in part, on a resource requirement for each virtual machine and an interrupt period for each virtual machine, wherein said virtual machine monitor comprises a detector capable of determining whether each of said virtual machines issues a predetermined instruction and indicating said determinations to a proportional integral derivative controller;

said proportional integral derivative controller being capable of adjusting said respective resource requirement for said each virtual machine based, at least in part, on said determination and communicating said adjusted respective resource requirement to a scheduler; and an interface capable of communicating respective resource requirement and interrupt period values for said each virtual machine to said virtual machine monitor.

22. The system of claim 21, wherein said virtual machine monitor comprises:

a feedback loop capable of determining a respective resource requirement for said each virtual machine;

a hardware interrupt virtualizer capable communicating device interrupts to said plurality of virtual machines and filtering non-periodic interrupts;

an interrupt period detector capable of determining said periods for periodic interrupts and communicating said periods to a scheduler; and said scheduler being capable of said scheduling of said plurality of virtual machines.

* * * * *

UNITED STATES PATENT AND TRADEMARK OFFICE
CERTIFICATE OF CORRECTION

| | | |
|---|---|---|
| PATENT NO. | : 7,356,817 B1 | Page 1 of 1 |
| APPLICATION NO. | : 09/541444 | |
| DATED | : April 8, 2008 | |
| INVENTOR(S) | : Cota-Robles et al. | |

It is certified that error appears in the above-identified patent and that said Letters Patent is hereby corrected as shown below:

In column 5, at line 2, delete "H/N" and insert --H/W--.

In column 5, at line 12, delete "HAN" and insert --H/W--.

Signed and Sealed this

Seventeenth Day of March, 2009

JOHN DOLL
*Acting Director of the United States Patent and Trademark Office*